(12) United States Patent
Verschuren

(10) Patent No.: US 8,749,166 B2
(45) Date of Patent: Jun. 10, 2014

(54) METHOD AND DEVICE FOR DRIVING AN OLED DEVICE

(75) Inventor: Coen Adrianus Verschuren, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 219 days.

(21) Appl. No.: 13/379,047

(22) PCT Filed: Jun. 14, 2010

(86) PCT No.: PCT/IB2010/052641
§ 371 (c)(1),
(2), (4) Date: Mar. 8, 2012

(87) PCT Pub. No.: WO2010/146523
PCT Pub. Date: Dec. 23, 2010

(65) Prior Publication Data
US 2012/0176061 A1 Jul. 12, 2012

(30) Foreign Application Priority Data
Jun. 19, 2009 (EP) ..................................... 09163191

(51) Int. Cl.
*H05B 37/02* (2006.01)

(52) U.S. Cl.
USPC ............................. 315/291; 345/204; 315/246

(58) Field of Classification Search
USPC .......................... 315/246, 291, 307; 345/204
See application file for complete search history.

(56) References Cited

U.S. PATENT DOCUMENTS

2013/0043803 A1* 2/2013 Raj ............................ 315/241 R
2013/0069548 A1* 3/2013 Takahashi et al. ......... 315/200 R

FOREIGN PATENT DOCUMENTS

| EP | 1085496 A2 | 3/2001 |
| EP | 1942706 A1 | 7/2008 |
| EP | 2203031 A2 | 6/2010 |
| WO | 2008090497 A2 | 7/2008 |
| WO | 2009041437 A1 | 4/2009 |

* cited by examiner

*Primary Examiner* — Don Le
(74) *Attorney, Agent, or Firm* — Yuliya Mathis

(57) ABSTRACT

An OLED has a characteristic threshold voltage (V2) above which the OLED is to be considered ON. A method for driving an OLED (20) includes the steps of switching the OLED on and off. According to the invention, a method for driving an OLED (20) includes of avoiding driving the OLED within a voltage range between zero and a predetermined voltage level (Vx) higher than zero, wherein this predetermined voltage level (Vx) may be in the order of said characteristic threshold voltage (V2). As a result, damage to the OLED is prevented or reduced, resulting in increased reliability of the OLED in terms of life time expectancy.

11 Claims, 3 Drawing Sheets

METHOD AND DEVICE FOR DRIVING AN OLED DEVICE

FIELD OF THE INVENTION

The present invention relates in general to OLED devices, and more particular to a driver for such devices.

BACKGROUND OF THE INVENTION

OLED (organic light emitting diode) devices are commonly known, so a detailed explanation is not necessary here. Suffice it to say that an OLED comprises a layer of a special type of polymer or small molecules, arranged between a cathode layer and an anode layer. When a voltage is applied between these cathode and anode layers, the intermediate OLED layer emits light (in contrast to an inorganic LED on the basis of PN junctions, which typically behaves as a point source).

FIG. 1A is a graph illustrating the current (vertical axis) versus voltage (horizontal axis) characteristic of an OLED having normal behavior. When the device is OFF, the voltage is zero and the current is zero. When the device is switched ON, the voltage rises and so does the current. The precise shape of the current/voltage curve may be device dependent, but in general the current is negligibly small in a first voltage range (in the example of FIG. 1A, the current remains below 0.1 µA for a voltage from zero up to about 2.5 V), and then the current quickly rises to reach a value of about 1 mA at about 4 V, when the device is considered to be ON. A device showing such normal behavior will in the context of the present invention be indicated as a "healthy" device, and it will be considered to be in a "healthy condition".

A problem with OLEDs is that an OLED can be in a faulty condition; such device will in the context of the present invention be indicated as a "faulty" device. FIG. 1B is a graph similar to FIG. 1A, illustrating the current versus voltage characteristic of a faulty OLED. For voltages higher than the first voltage range, there is no visible difference, but for voltages in the first voltage range the current can become substantially higher, for example a few to several tens of times, in extreme cases (as illustrated in FIG. 1B, curve 2) even in the order of 100×-1000×: depending on the driving history of the device, in particular in the range from 0 to 2.5 V, an OLED device may switch from a healthy state (curve 1) to a faulty state (curve 2). In the following, the current for a faulty device will be indicated as "faulty current" while the current for a healthy device will be indicated as "healthy current".

It is noted that, at least in principle, any OLED can make a transition from a healthy state to a faulty state. The difference between faulty current and healthy current level may differ between different OLEDs. In the example of FIG. 1B, the faulty current is lower for voltages just above the first voltage range as compared to voltages in the first voltage range, but this does not necessarily apply to all OLEDs.

It is further noted that, in practice, an OLED is either ON or OFF, and it will be in the transition from ON to OFF or back for only a very brief moment of time. Thus, at first sight it may seem that the problem is not severe, since in the ON state the current is the same for a faulty device. However, when an OLED is in its faulty state, its lifetime can be reduced substantially. This effect is believed to be caused by the fact that the current is not evenly distributed over the device's surface but is flowing only locally, leading to very high local current densities capable of locally destroying the device.

The present invention aims to increase the reliability and lifetime of OLEDs.

Whereas the above-described effect can be compared to some kind of short-circuiting in the device, one solution might be to remedy the short-circuit location after it has already occurred. However, this will most likely lead to a defective spot in the device (dark spot). In contrast, the present invention tries to prevent such short-circuiting from occurring, or at least reduce the chances on its occurrence.

SUMMARY OF THE INVENTION

While an OLED can in principle be considered to be either ON or OFF, in practice the OLED can be considered to have three different operational states:
1) OFF: voltage drop over the OLED is equal to zero, or less than a first voltage level V1, wherein V1 is very low, i.e. in the order of some microVolts.
2) ON: voltage drop over the OLED is higher than a second voltage level V2, wherein V2 is in the order of some Volts: a typical value is about 4 V.
3) an intermediate state wherein the voltage drop over the OLED is between V1 and V2; this state will hereinafter be indicated as a twilight state.

Said voltage levels V1 and V2 may vary from one OLED to another. Further, the exact value of said voltage levels may depend on the exact definition used for defining them; one suitable definition for V2 is the voltage at which the OLED starts emitting light, which is often close to the so-called built-in voltage of the OLED. In any case, said voltage levels are considered to be device properties.

In an experiment, the inventor has swept the operating voltage of an OLED back and forth through a voltage range from 4 to 6 Volts, at a sweep rate of about 1 V/s, for several hundreds of times: the OLED did not show any current anomalies, and continued to operate satisfactorily. This experiment was repeated with different OLEDs, leading to the same results. The inventor also tested OLEDs, both brand new ones as well as OLEDs that had been tested in the above-mentioned tests, by sweeping the operating voltage back and forth through a voltage range from 0 to 6 Volts: it appeared that those OLEDs without exception failed within as few as 10 sweeps.

In conventional illumination devices where an OLED would be continuously in its ON state, there will probably be no problem with the reliability, i.e. life time. However, in practice it will be rare for any illumination device to be continuously ON: in practice, an illumination device will be switched ON and OFF now and then. In conventional illumination devices, switching ON and OFF will involve the voltage rising from zero to above V2, and will involve the voltage dropping from above V2 to zero, which means sweeping through the twilight state. Intuitively, one might think that the brief operation at low voltages would not harm the device, and that higher voltages would be more harmful to any device. However, this appears not to be correct for OLEDs. Based on the above experiments, the inventor has drawn the conclusion that operating an OLED in its twilight state will substantially reduce the life time of such OLED, but that an OLED can have a prolonged life time if it is only operated in the ON state and/or the OFF state. Based on this insight, the present invention proposes to avoid operation in the twilight state as much as possible.

According to the present invention, a driver is provided with a current blocking device in series with its output in order to prevent or at least limit output current at low output voltages. The current blocking device may be provided as a separate device but may also be incorporated in a driver.

Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1A:
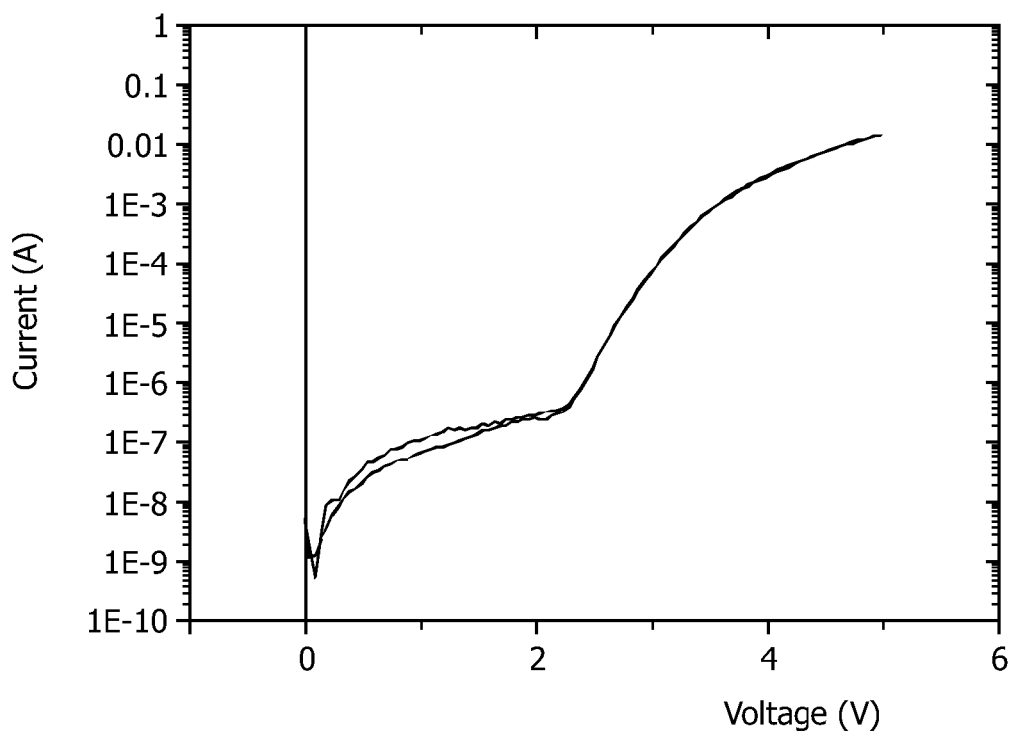
FIGS. 1A and 1B are graphs illustrating the current/voltage characteristic of an OLED.
Figure 1B:
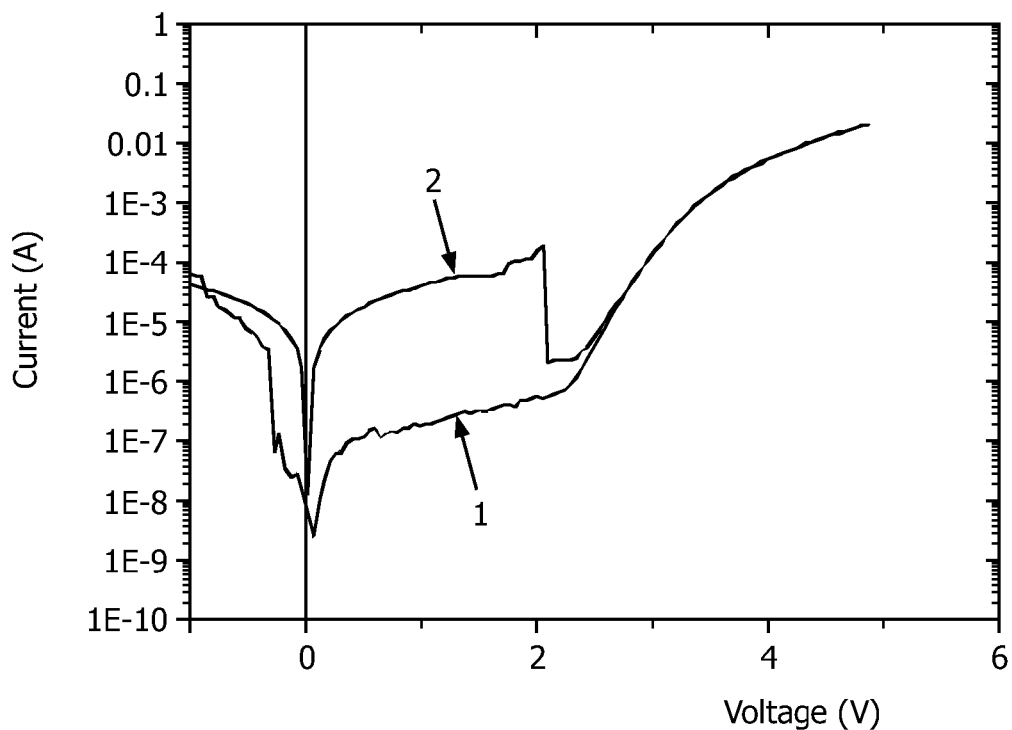
Figure 2:
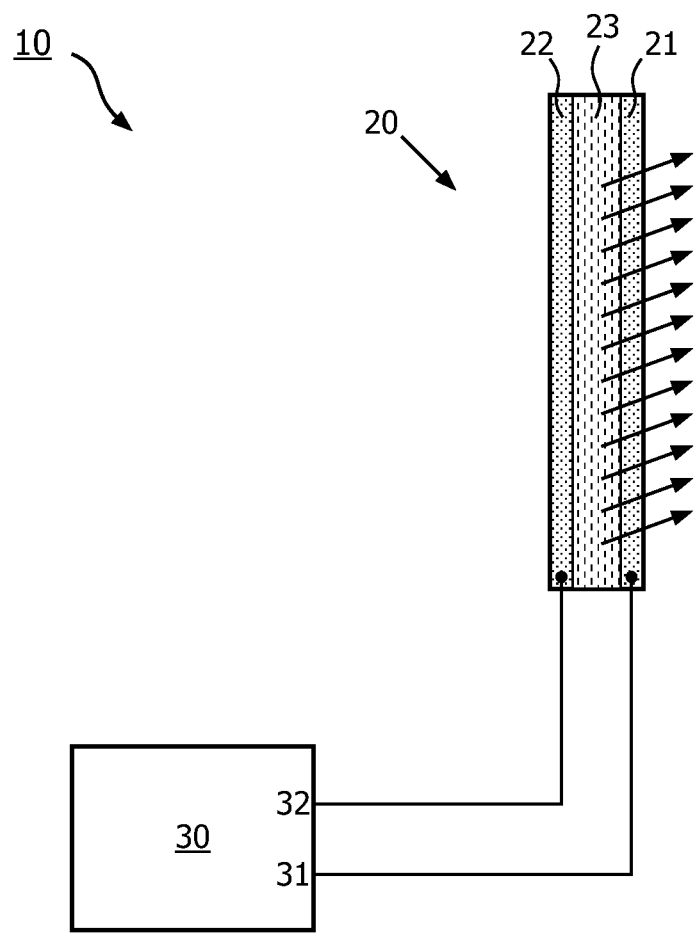
FIG. 2 is a block diagram schematically illustrating an illumination device comprising an OLED and a driver.

FIG. 2 schematically shows an illumination device 10 comprising an OLED 20 and a driver 30. The OLED 20 comprises a light-emitting layer 23 of polymer or small molecules, arranged between an anode layer 21 and a cathode layer 22. Since OLEDs are known per se, a further explanation is not needed here. The driver 30 has output terminals 31, 32 connected to the anode 21 and cathode 22, respectively.

The driver 30 may be supplied from mains (AC) or a battery (DC), but this is not relevant for the present invention and not shown. In any case, the driver 30 is basically a voltage source capable of generating at its output terminals 31, 32 a suitable voltage and current for driving the OLED 20.

Prior art drivers are basically capable of generating any voltage between zero and an operating voltage V0 of, for instance, 6 V. When switching on or off, their output voltage basically runs through the entire range from zero to V0 or back. It may be possible to design a driver such that the rise time and fall time of its output voltage is extremely small, but usually the rise speed and fall speed (in V/s) are not known and/or too low for comfort. In a first embodiment implementing the inventive concept of the present invention, a driver device 100 is designed to virtually skip a voltage range between zero and a predetermined voltage level Vx, so that it can only generate an output voltage of zero or within a range from Vx and higher. Vx may for instance be selected to be any voltage between 3 V and V0. For instance, Vx may be equal to 4 V, or Vx may be equal to V0−2 V. It is also possible that Vx is deliberately selected to be higher than V0; for instance, Vx may be 1-2 V higher than V0.

Figure 3:
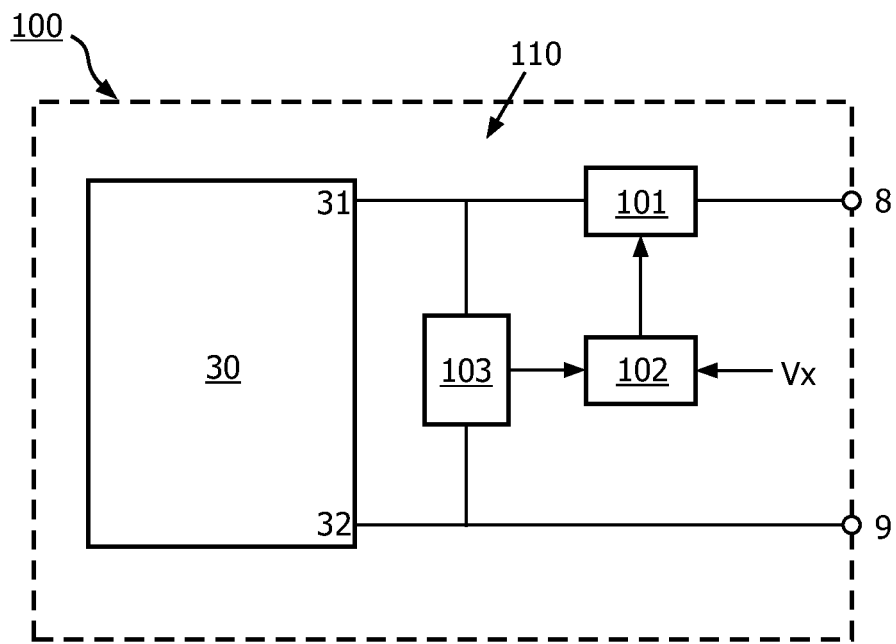
FIG. 3 is a block diagram illustrating a first embodiment of an OLED driver according to the present invention.

FIG. 3 is a block diagram schematically illustrating a possible implementation of this driver device 100. The driver device 100 comprises a driver stage 30, which may be identical to the driver 30 discussed above, and an output stage 110 which comprises a controllable switch 101 in series with one of the output terminals, controlled by a control device 102, which may for instance be implemented as a suitably programmed controller or microprocessor. A voltage sensor 103 senses the voltage across the output terminals 31, 32 and provides a measuring signal to the controller 102. The controller 102 compares the measuring signal with the predetermined voltage level Vx. If the measuring signal indicates an output voltage less than Vx, the controller 102 generates a control signal for the controllable switch 101 such that the switch is open (non-conductive). If the measuring signal indicates an output voltage equal to or higher than Vx, the controller 102 generates a control signal for the controllable switch 101 such that the switch is closed (conductive). According to a specific feature of the present invention, the switch 101 and the control signal are designed such that the output voltage at the device output terminals 8, 9 has a rise steepness and fall steepness of at least 100 V/s, preferably higher than 1 kV/s, and more preferably even higher than 10 kV/s; in practice, it should easily be possible to achieve a steepness better than 100 kV/s, so that a step from zero to 5 V output voltage can be made within a time interval of 50 μs or less.

It is noted that the rise steepness and fall steepness of the driver stage 30 are not essential. If the output of the driver stage rises slowly, the control device 102 will keep the switch 101 open (i.e. non-conductive), until at a certain moment the switch 101 is closed quickly and the device output voltage (i.e. the output voltage of the output stage 110) quickly rises.

It is noted that the voltage sensor and controller may be integrated in one unit. It is further noted that the combination of controllable switch, controller and voltage sensor, which together form a voltage blocking device 110, may be part of the driver, as shown, but it is also possible that this combination is implemented as a separate device to be connected between any driver and an OLED, or it may even be implemented as a unit integrated with an OLED or accommodated in an OLED housing.

Figure 4:
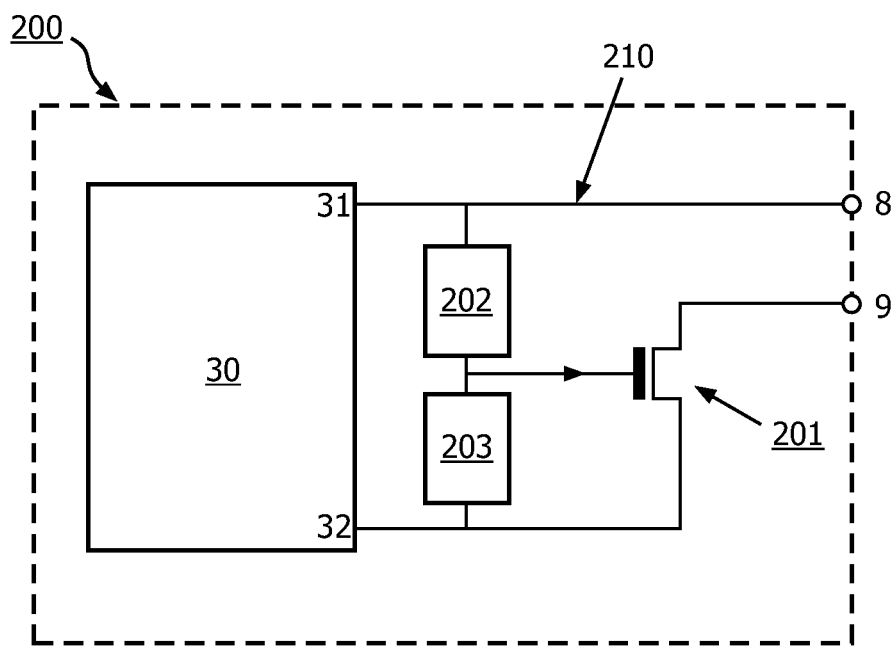
FIG. 4 is a block diagram illustrating a second embodiment of an OLED driver according to the present invention.

FIG. 4 is a block diagram schematically illustrating a second embodiment of this driver device, indicated with reference numeral 200. The driver device 200 comprises a driver stage 30, which may be identical to the driver 30 discussed above, and an output stage 210 which comprises a FET 201 having its drain-source path connected in series with one of the output terminals, and having its gate connected to a node of a resistive voltage divider formed by a series arrangement of two resistors 202, 203 connected across the driver stage output terminals 31, 32. As long as the output voltage across the driver stage output terminals 31, 32 is low, the FET 201 is non-conductive. If the output voltage across the driver stage output terminals 31, 32 exceeds a predetermined level, the FET 201 is conductive. This precise level depends on the divider ratio of the resistors 202, 203 and the properties of the FET, as should be clear to a person skilled in the art.

In an experimental set-up, R1 was selected to be 10 kΩ, and R2 was selected to be 3 kΩ. As a result, all current was suppressed very strongly for voltages below 3.2 V, while for voltages above 3.6 V the OLED operated as normal.

Again, it is noted that the rise steepness and fall steepness of the driver stage 30 are not essential. If the output of the driver stage rises slowly, the FET will remain open (i.e. non-conductive), until at a certain moment the FET 201 closes quickly and the device output voltage (i.e. the output voltage of the output stage 210) quickly rises.

If desired, it is possible to connect an additional resistor of for instance 1 kΩ in parallel to the OLED, in order to further suppress the residual current at low voltages. Further, if a steeper switching behavior is desired, it is possible to use one or more additional FETs in cascade.

It is noted that the combination of FET and resistors, which together form a current blocking device 210, may be part of the driver, as shown, but it is also possible that this combination is implemented as a separate device to be connected between any driver and an OLED, or it may even be implemented as a unit integrated with an OLED or accommodated in an OLED housing. In any case, this combination has the advantage of being very small and inexpensive.

Summarizing, the present invention provides a method for driving an OLED 20. Considering that an OLED has a characteristic threshold voltage V2 above which the OLED is to be considered ON, and that driving an OLED 20 includes the steps of switching the OLED on and off, a method according to the invention has the characteristic feature of avoiding driving the OLED within a voltage range between zero and a predetermined voltage level Vx higher than zero, wherein this predetermined voltage level Vx may be in the order of said characteristic threshold voltage V2. As a result, damage to the OLED is prevented or reduced, resulting in increased reliability of the OLED in terms of life time expectancy.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

Particularly, it is noted that the controllable switching element 101, 201, may have two states, i.e. OPEN=conductivity zero and CLOSED=resistance zero, such as to actually block voltage and current, but it is also possible that the controllable switching element 101, 201 has an OPEN state with very low but finite conductivity and a CLOSED state with very low but finite resistance, so that in the OPEN state current is allowed but at a very low level.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. Method for driving an organic light emitting diode (OLED), the OLED having a characteristic threshold voltage above which the OLED is on, the method comprising:
   switching the OLED on or off; and
   blocking a connection between the OLED and a voltage source in response to said voltage source providing a voltage within a voltage range between zero and a predetermined voltage level higher than zero.

2. Method according to claim 1, wherein said predetermined voltage level is equal to said characteristic threshold voltage or at most 2 V lower than said characteristic threshold voltage.

3. Method according to claim 1, wherein said predetermined voltage level is equal to said characteristic threshold voltage or at most 2 V higher than said characteristic threshold voltage.

4. Method according to claim 1, comprising the step of generating a driving voltage and increasing the driving voltage from zero to an operating value above said range or decreasing the driving voltage from said operating value to zero, the method further comprising the step of blocking the driving voltage to be applied to the OLED as long as the driving voltage is within said voltage range.

5. Method according to claim 1, comprising the step of generating a driving voltage and increasing the driving voltage from zero to an operating value above said range or decreasing the driving voltage from said operating value to zero, wherein the rise steepness or fall steepness of the driving voltage within said voltage range is at least 100 V/s.

6. Method according to claim 1, comprising the step of generating a driving voltage and applying this driving voltage to the OLED, the method further comprising the step of blocking current flow in the OLED if the driving voltage is within said voltage range.

7. Driver device for driving an organic light emitting diode (OLED), comprising:
   a voltage source for providing an OLED driving voltage, having source output terminals;
   a device output terminal for connection to the OLED, coupled to a respective source output terminal of the source output terminals; and
   an output stage comprising a voltage-controlled blocking element arranged between the respective source output terminal and the device output terminal, the blocking element being controlled by an output voltage at the source output terminals.

8. Driver device according to claim 7, wherein the output stage comprises:
   a controllable switch connected in series between the respective source output terminal and the device output terminal;
   a voltage sensor coupled to the source output terminals for providing a measuring signal indicating a momentary output voltage of the voltage source;
   a control device coupled to receive the measuring signal from the voltage sensor and designed to control the controllable switch such that the switch is non-conductive if said momentary output voltage is lower than said predetermined voltage level and conductive if said momentary output voltage is higher than said predetermined voltage level.

9. Driver device according to claim 7, wherein the output stage comprises:
   a controllable switch connected in series between the respective source output terminal and the device output terminal;
   a series arrangement of two resistors coupled to the source output terminals, wherein a node between said two resistors is coupled to a control input terminal of said controllable switch.

10. Driver device according to claim 8, wherein said controllable switch comprises at least one field-effect transistor (FET).

11. Illumination device, comprising an OLED and a driver device according to claim 7.

\* \* \* \* \*